United States Patent
Tzidon et al.

(10) Patent No.: US 11,515,574 B2
(45) Date of Patent: Nov. 29, 2022

(54) METHOD FOR PRODUCING AN ELECTROLYTE FOR A METAL AIR BATTERY

(71) Applicant: PHINERGY LTD, Lod (IL)

(72) Inventors: Dekel Tzidon, Hod Hasharon (IL); Avraham Melman, Holon (IL)

(73) Assignee: PHINERGY LTD., Lod (IL)

( * ) Notice: Subject to any disclaimer, the term of this patent is extended or adjusted under 35 U.S.C. 154(b) by 226 days.

(21) Appl. No.: 16/792,928

(22) Filed: Feb. 18, 2020

(65) Prior Publication Data

US 2020/0185801 A1    Jun. 11, 2020

Related U.S. Application Data

(63) Continuation of application No. 14/390,494, filed as application No. PCT/IL2013/050249 on Mar. 15, 2013, now abandoned.

(Continued)

(51) Int. Cl.
| | |
|---|---|
| *H01M 10/42* | (2006.01) |
| *H01M 8/04291* | (2016.01) |
| *H01M 8/0438* | (2016.01) |
| *H01M 8/20* | (2006.01) |
| *H01M 8/0444* | (2016.01) |
| *H01M 8/04492* | (2016.01) |
| *H01M 8/04082* | (2016.01) |
| *H01M 8/0432* | (2016.01) |

(Continued)

(52) U.S. Cl.
CPC ..... *H01M 10/4242* (2013.01); *H01M 8/0438* (2013.01); *H01M 8/04186* (2013.01); *H01M 8/04201* (2013.01); *H01M 8/04291* (2013.01); *H01M 8/04365* (2013.01); *H01M 8/04477* (2013.01); *H01M 8/04529* (2013.01); *H01M 8/20* (2013.01); *H01M 12/06* (2013.01); *H01M 12/08* (2013.01); *H01M 12/085* (2013.01); *H01M 2250/20* (2013.01); *H01M 2300/0014* (2013.01); *Y02E 60/10* (2013.01); *Y02P 70/50* (2015.11); *Y02T 90/40* (2013.01)

(58) Field of Classification Search
None
See application file for complete search history.

(56) References Cited

U.S. PATENT DOCUMENTS

| | | |
|---|---|---|
| 3,513,031 A | 5/1970 | Zaromb |
| 4,081,693 A | 3/1978 | Stone |

(Continued)

FOREIGN PATENT DOCUMENTS

| | | |
|---|---|---|
| EP | 0 311 275 | 4/1989 |
| JP | 11-344372 | 12/1999 |
| JP | 2006-334498 | 12/2006 |

OTHER PUBLICATIONS

European Search Report for Application No. EP13772716.0 dated Aug. 20, 2015.

(Continued)

*Primary Examiner* — Ula C Ruddock
*Assistant Examiner* — Tony S Chuo
(74) *Attorney, Agent, or Firm* — Pearl Cohen Zedek Latzer Baratz LLP

(57) ABSTRACT

This invention provides a system and a method for safe production of electrolyte at required concentration on site on demand where occasionally only water is needed to be filled up. The system includes two main units: a saturated electrolyte unit and a diluted electrolyte unit.

18 Claims, 1 Drawing Sheet

Related U.S. Application Data

(60) Provisional application No. 61/619,973, filed on Apr. 4, 2012.

(51) Int. Cl.
*H01M 12/08* (2006.01)
*H01M 8/04186* (2016.01)
*H01M 12/06* (2006.01)

(56) References Cited

U.S. PATENT DOCUMENTS

| | | | |
|---|---|---|---|
| 4,719,156 A | 1/1988 | Niksa | |
| 4,816,352 A | 3/1989 | Gordon | |
| 4,842,963 A | 6/1989 | Ross | |
| 5,208,526 A | 5/1993 | Goldman et al. | |
| 5,648,183 A | 7/1997 | Licht et al. | |
| 5,716,726 A | 2/1998 | Cheiky | |
| 5,849,427 A | 12/1998 | Siu et al. | |
| 6,033,343 A | 3/2000 | Licht | |
| 7,582,371 B2 | 9/2009 | Akiyama et al. | |
| 2010/0196768 A1 | 8/2010 | Roberts et al. | |
| 2011/0048961 A1 | 3/2011 | Smedley | |
| 2012/0021303 A1 | 1/2012 | Amendola et al. | |

OTHER PUBLICATIONS

International Search Report for Application No. PCT/IL13/50249 dated Jul. 11, 2013.
U.S. Office Action for U.S. Appl. No. 14/390,494, dated May 6, 2016.
U.S. Final Office Action for U.S. Appl. No. 14/390,494, dated Oct. 17, 2016.
U.S. Office Action for U.S. Appl. No. 14/390,494, dated Apr. 6, 2017.
U.S. Final Office Action for U.S. Appl. No. 14/390,494, dated Oct. 10, 2017.
U.S. Office Action for U.S. Appl. No. 14/390,494, dated Mar. 22, 2018.
U.S. Final Office Action for U.S. Appl. No. 14/390,494, dated Aug. 31, 2018.
U.S. Office Action for U.S. Appl. No. 14/390,494, dated May 16, 2019.
U.S. Final Office Action for U.S. Appl. No. 14/390,494, dated Nov. 25, 2019.

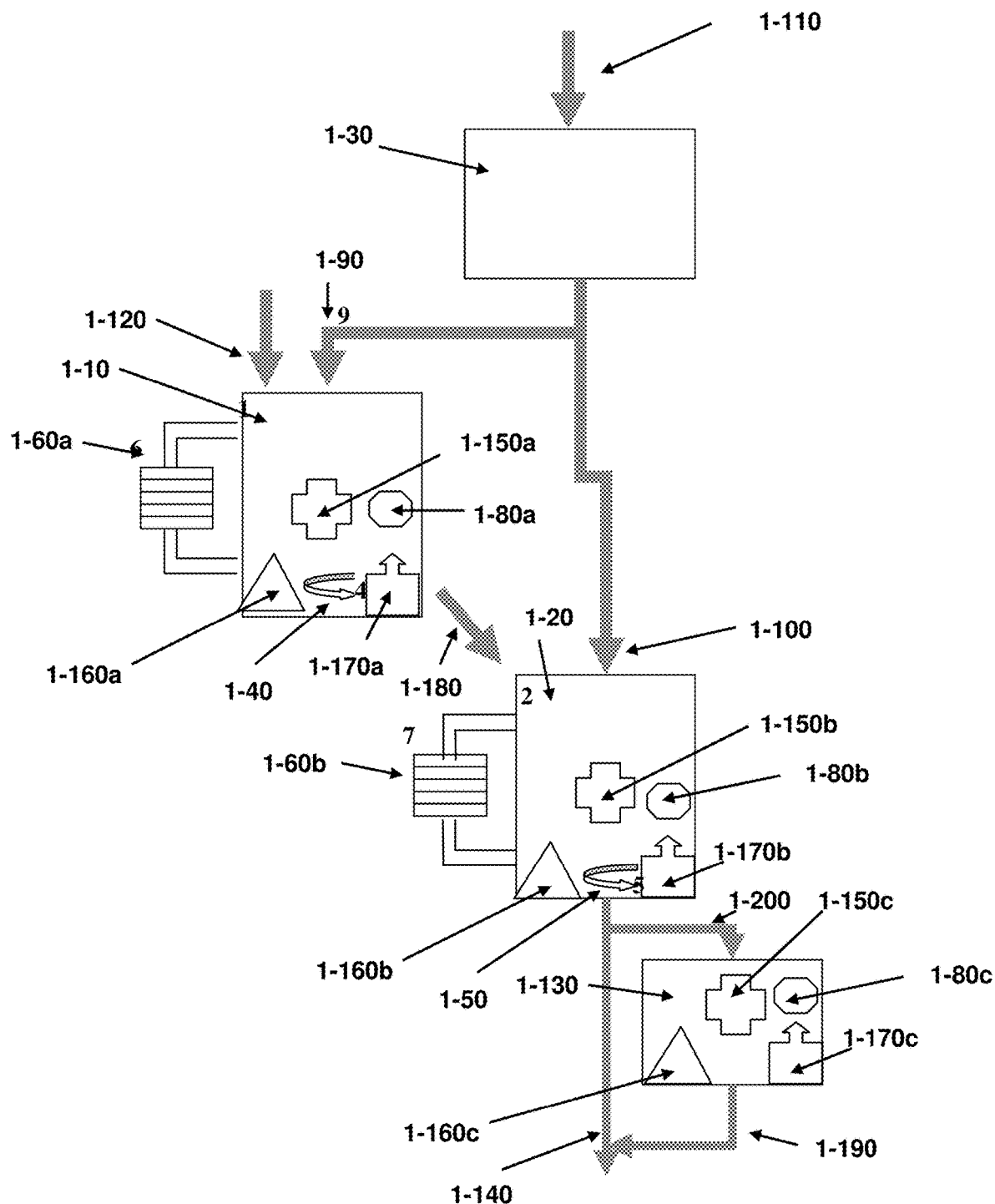

METHOD FOR PRODUCING AN ELECTROLYTE FOR A METAL AIR BATTERY

CROSS-REFERENCE TO RELATED APPLICATIONS

This application is a continuation of U.S. application Ser. No. 14/390,494, filed Oct. 3, 2014, which is a National Phase Application of PCT International Application No. PCT/IL2013/050249, International Filing Date Mar. 15, 2013, claiming the benefit of U.S. Provisional Patent Application No. 61/619,973, filed Apr. 4, 2012, which are hereby incorporated by reference.

FIELD OF THE INVENTION

This invention relates to systems and methods for producing an electrolyte.

BACKGROUND OF THE INVENTION

Batteries are electrochemical systems that in most cases require an electrolyte solution for their operation. Batteries utilizing an electrolyte solution require periodical electrolyte replacement, when the electrolyte cannot absorb additional reaction products.

A battery that is used for portable machines, engines or appliances such as batteries for electrical vehicles require electrolyte replacement at different sites, similar to gas refueling stations. However, transportation of electrolyte in its operational liquid form, storage of liquid electrolyte in gas stations and filling up liquid electrolyte into the battery on the vehicle may be complicated and expensive. Therefore, there is a need for a system that efficiently and safely replenishes liquid electrolyte in a battery on e.g. an electrically-operated vehicle.

SUMMARY OF THE INVENTION

In one embodiment, this invention provides systems and methods for preparing an electrolyte for use in metal air batteries. The preparation of the electrolyte is done adjacent to the metal air battery that consumes the electrolyte. For a metal air battery that is used to operate an electric vehicle, the electrolyte production system of this invention is located in the vehicle. In one embodiment, electrolyte preparation and transfer is done automatically and safely, while optionally utilizing the excess heat formed during preparation for the benefit of the metal air battery.

In one embodiment, systems and methods of the present invention provide increased safety and heat management efficiency due to dilution in two steps. This is achieved by first preparing a saturated solution and then diluting the saturated solution to the required concentration instead of preparing the diluted solution directly by dissolving solid in the correct amount of liquid. This stepwise preparation method reduces the corresponding heat release.

In one embodiment, systems of the invention provide simpler and less expensive infrastructure for supplies as only solid is transported, and is diluted on-board.

In one embodiment, systems and method of the present invention have the advantage that after system initialization the user only needs to add more water to produce more electrolyte. This is a big advantage for use in electric vehicles since the user of the electric vehicle only need to add water to the system to produce more electrolyte. The possibility to take water for dilution on the vehicle's board from an exterior source (according to the need) has additional advantage of making the system of the invention much simpler and lighter.

In one embodiment, this invention provides a system for producing an electrolyte for a metal air battery, said system comprising:
- a saturated electrolyte unit comprising at least one inlet and at least one outlet; and
- a diluted electrolyte unit comprising at least one inlet and at least one outlet;
- wherein a first outlet of the saturated electrolyte unit is connected to a first inlet of said diluted electrolyte unit such that saturated electrolyte can be transferred from said saturated electrolyte unit to said diluted electrolyte unit; and wherein said first outlet of said diluted electrolyte unit is connected to the metal air battery.

In one embodiment, a first inlet of the saturated electrolyte unit, a second inlet of the diluted electrolyte unit or combination thereof are connected to a liquid source from which liquid can be transferred to said saturated electrolyte unit, to said diluted electrolyte unit or to a combination thereof.

In one embodiment, this invention provides a method for producing an electrolyte for a metal air battery, said method comprising:
- preparing a saturated electrolyte solution from a solid ionic compound and from a liquid in a saturated electrolyte unit such that said unit comprises both said solution and said solid;
- transferring a portion of said saturated electrolyte solution from said saturated electrolyte unit to a diluted electrolyte unit; and
- adding water to said diluted electrolyte unit, wherein said water mix with said saturated solution within said diluted electrolyte unit to form a diluted electrolyte composition at a concentration suitable for a metal air battery.

In one embodiment, the adding water step is conducted prior to, during or after said transferring step.

In one embodiment, this invention provides a method for producing an electrolyte for a metal air battery, said method comprising:
- preparing a saturated electrolyte solution from a solid ionic compound and from a liquid in a saturated electrolyte unit such that said unit comprises both said solution and said solid;
- transferring a portion of said saturated electrolyte from said saturated electrolyte unit to a diluted electrolyte unit; and
- adding water to said saturated electrolyte unit wherein said water mix with said saturated solution causing more solid to dissolve so more saturated electrolyte is produced and is ready for transfer to said diluted electrolyte unit.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

The FIGURE is a flow chart illustrating an electrolyte production system of the invention and method of preparing the electrolyte.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment this invention provides a system for producing an electrolyte for a metal air battery, said system comprising:
a saturated electrolyte unit comprising at least one inlet and at least one outlet; and
a diluted electrolyte unit comprising at least one inlet and at least one outlet;
wherein a first outlet of said saturated electrolyte unit is connected to a first inlet of said diluted electrolyte unit such that saturated electrolyte can be transferred from said saturated electrolyte unit to said diluted electrolyte unit; and wherein said first outlet of said diluted electrolyte unit is connected to said metal air battery.

In one embodiment, the first inlet of said saturated electrolyte unit, a second inlet of said diluted electrolyte unit or combination thereof are connected to a liquid source from which liquid can be transferred to said saturated electrolyte unit, to said diluted electrolyte unit or to a combination thereof. In one embodiment, the metal air battery is used for operating an electric vehicle. In one embodiment, the liquid source is located either on the vehicle's board or external to the vehicle. In one embodiment, the metal air battery is an Aluminum (Al) air battery. In one embodiment, the liquid source comprises a tank. In one embodiment, the liquid is water. In one embodiment, the liquid comprises water. In one embodiment, liquid further comprises stabilizing agents, wherein said stabilizing agent comprise stannates, nano-sized ceramic materials or combination thereof. In one embodiment, the system further comprising one or more heat exchanger(s) connected to the saturated electrolyte unit or to said diluted electrolyte unit. In one embodiment, the saturated electrolyte unit, said diluted electrolyte unit or combination thereof further comprise a liquid level tester, a density meter, a conductivity meter or combination thereof. In one embodiment, the saturated electrolyte unit comprises solid KOH and a KOH saturated solution or solid NaOH and a NaOH saturated solution. In one embodiment, the weight ratio of (solid KOH:KOH saturated solution) or of (solid NaOH:NaOH saturated solution) is between (1:20) to (100:1). In one embodiment, by mixing saturated electrolyte supplied by said saturated electrolyte unit with a liquid supplied by said liquid source, within said diluted electrolyte unit, said diluted electrolyte unit comprises an electrolyte composition suitable for said metal air battery operation.

In one embodiment, the electrolyte composition further comprises materials for enhancement of metal air battery performance. In one embodiment, the metal air battery further comprises electrolyte monitors/sensors for testing electrolyte pH, density, temperature, pressure, volume, weight, concentration of metal fuel, Na+ and/or K+ content, electrolyte conductivity or a combination thereof.

In one embodiment, this invention provides a method for producing electrolyte for a metal air battery, said method comprising:
preparing a saturated electrolyte solution from a solid ionic compound and from a liquid in a saturated electrolyte unit such that said unit comprises both said solution and said solid;
transferring a portion of said saturated electrolyte solution from said saturated electrolyte unit to a diluted electrolyte unit; and
adding water to said diluted electrolyte unit, wherein said water mix with said saturated solution within said diluted electrolyte unit to form a diluted electrolyte composition at a concentration suitable for a metal air battery.

In one embodiment, the adding water step is conducted prior to, during or after said transferring step. In one embodiment, the diluted electrolyte composition is transferred from said diluted electrolyte unit to said metal air battery. In one embodiment, the metal air battery is used for operating an electric vehicle. In one embodiment, the metal air battery is an Aluminum (Al) air battery. In one embodiment, the water further comprising stabilizing agents, wherein said stabilizing agent comprise stannates, nano-sized ceramic materials or a combination thereof. In one embodiment, the saturated electrolyte unit, said diluted electrolyte unit or combination thereof further comprises a liquid level tester, a density meter, a conductivity meter or a combination thereof.

In one embodiment, the saturated electrolyte unit comprises solid KOH and KOH saturated solution; or solid NaOH and NaOH saturated solution. In one embodiment, upon depletion or consumption of said solid KOH or solid NaOH, more solid KOH or more solid NaOH is added to said saturated electrolyte unit.

In one embodiment, after the solution preparation step the (solid:saturated solution) weight ratio of (solid KOH:KOH saturated solution) or of (solid NaOH:NaOH saturated solution) is between (1:20) to (100:1) in the saturated electrolyte unit.

In one embodiment, the electrolyte composition further comprises materials for enhancement of metal air battery performance. In one embodiment, the metal-air battery further comprises electrolyte monitors/sensors for testing electrolyte pH, density, temperature, pressure, volume, weight, concentration of metal fuel, Na+ and/or K+ content, electrolyte conductivity or a combination thereof.

In one embodiment, the method further comprising a step of solid addition to said saturated electrolyte unit when solid is depleted or consumed. In one embodiment, the method further comprising a step of liquid transfer from a liquid source to said saturated electrolyte unit, to said diluted electrolyte unit or to a combination thereof upon demand.

In one embodiment, the liquid transfer from a liquid source to said saturated electrolyte unit is conducted upon depletion or consumption of said saturated solution. In one embodiment, liquid transfer from a liquid source to said diluted electrolyte unit is conducted upon depletion or consumption of said diluted solution.

In one embodiment, the liquid source is placed on a vehicle operated by said metal-air battery. In one embodiment, the vehicle is a bicycle, car, truck, bus, motorcycle, train, ship, boat, aircraft or a spacecraft. In one embodiment, the liquid source is placed external to said vehicle operated by said battery. In one embodiment, the liquid source is placed in a road-side station.

In one embodiment, this invention provides a method for producing electrolyte for a metal air battery, said method comprising:
preparing a saturated electrolyte solution from a solid ionic compound and from a liquid in a saturated electrolyte unit such that said unit comprises both said solution and said solid;
transferring a portion of said saturated electrolyte from said saturated electrolyte unit to a diluted electrolyte unit; and
adding water to said saturated electrolyte unit wherein said water mix with said saturated solution causing more solid to dissolve so more saturated electrolyte is produced and is ready for transfer to the diluted electrolyte unit.

In one embodiment, this invention provides a method for producing electrolyte for a metal air battery, said method comprising:
preparing a saturated electrolyte solution from a solid ionic compound and from a liquid in a saturated electrolyte unit such that said unit comprises both said solution and said solid;
transferring a portion of said saturated electrolyte solution from said saturated electrolyte unit to a diluted electrolyte unit;
adding water to said diluted electrolyte unit, wherein said water mix with said saturated solution within said diluted electrolyte unit to form a diluted electrolyte composition at a concentration suitable for a metal air battery.
adding water to said saturated electrolyte unit wherein said water mix with said saturated solution causing more solid to dissolve so more saturated electrolyte is produced and is ready for transfer to the diluted electrolyte unit.

In one embodiment, the step of adding water to the saturated unit is conducted prior to, during or after the step of adding water to the diluted unit. In one embodiment, at any given time, upon battery demand, diluted solution is transferred from the diluted unit to the battery. In one embodiment, at any given time, more solid ionic compound is added to the saturated unit.

In one embodiment, this invention provides a method for producing electrolyte for a metal air battery, said method comprising:
a. preparing a saturated electrolyte solution from a solid ionic compound and from a liquid in a saturated electrolyte unit such that said unit comprises both said solution and said solid;
b. transferring a portion of said saturated electrolyte solution from said saturated electrolyte unit to a diluted electrolyte unit;
c. adding water to said diluted electrolyte unit, wherein said water mix with said saturated solution within said diluted electrolyte unit to form a diluted electrolyte composition at a concentration suitable for a metal air battery;
d. adding water to said saturated electrolyte unit wherein said water mix with said saturated solution causing more solid to dissolve so more saturated electrolyte is produced and is ready for transfer to the diluted electrolyte unit.
e. transferring diluted electrolyte from said diluted unit to said battery;
f. optionally repeating steps b, c, d;
g. operating the battery,
h. draining the battery from used diluted electrolyte;
i. optionally repeating steps b, c, d, e or repeating step e only;
j. optionally repeating steps b, c, d;
k. repeating steps g and h;
l. optionally adding more solid ionic compound to said saturated electrolyte unit.
m. repeating steps b-k.

In one embodiment, step 1 of adding a solid is conducted prior to, during or after any of method steps f-k. In another embodiment, all method steps are the same except for step "a" wherein
preparing a saturated electrolyte solution from a solid ionic compound and from a liquid is conducted outside the saturated electrolyte unit and the formed saturated solution and a corresponding solid are transferred to said saturated unit such that said unit comprises both said solution and said solid. In one embodiment, if the saturated solution is aqueous KOH, the corresponding solid is KOH.

In one embodiment, this invention provides a method for producing electrolyte for a metal air battery, the method comprising:
preparing a saturated electrolyte solution from a solid ionic compound and from a liquid in a saturated electrolyte unit such that said unit comprises both said solution and said solid;
transferring a portion of said saturated electrolyte solution from said saturated electrolyte unit to a diluted electrolyte unit; and
adding water to said diluted electrolyte unit, wherein said water mix with said saturated solution within said diluted electrolyte unit to form a diluted electrolyte composition at a concentration suitable for a metal air battery.

In one embodiment, transfer and addition of liquids and solutions into and out of the saturated unit, the diluted unit or a combination thereof is conducted through inlets and outlets of the respective units. In one embodiment, the saturated electrolyte unit and the diluted electrolyte unit are connected by a hose, a tube or a conduit. In one embodiment, the saturated electrolyte unit and the diluted electrolyte unit are connected to a liquid source by a hose, a tube or a conduit. In one embodiment, the diluted electrolyte unit and the battery are connected by a hose, a tube or a conduit.

In one embodiment, the systems and methods of this invention are directed to producing electrolyte for a metal air battery for operating an electrical vehicle. In another embodiment, the metal air battery is an Aluminum (Al) air battery. In another embodiment the electrolyte comprises an alkaline salt. In another embodiment, the electrolyte comprises an alkaline hydroxide. In another embodiment, the electrolyte comprises NaOH or KOH. In one embodiment the solid ionic compound forming the electrolyte is KOH or NaOH.

In one embodiment, this invention provides systems and methods for the preparation of an electrolyte solution for use in a battery, wherein the electrolyte preparation system is located on the same appliance comprising the battery or in close proximity to it. In one embodiment such configuration provides better conditions for storing raw materials and handling them prior to use in the battery (e.g. a metal air battery for an electric vehicle). For example, in the case where the electrolyte solution comprises KOH, it should be prepared from dry solid KOH. However, dry solid KOH absorbs water and $CO_2$ from the air. It is therefore requires careful storage conditions. In systems of this invention, KOH is stored in a saturated solution, and is not exposed to air, thus eliminating the need for sophisticated packaging and un-packaging of the solid.

In one embodiment, systems and methods of this invention enable optional utilization of heat generated by dilution of the saturated solution. In some cases the electrolyte needs to be hot prior to its use. For example, an electrolyte comprising sodium hydroxide (NaOH) may be functional at a temperature of 50° C. Since the dilution of the saturated electrolyte is exothermic, the resultant electrolyte is at higher temperature than the ambient temperature. For example, if the electrolyte in use comprises 20% (wt/wt) sodium hydroxide and the ambient temperature is about 25° C., the electrolyte formed by dilution will reach the required temperature of around 50° C. as a result of the exothermic dilution process.

In one embodiment, a system of the invention comprises two units. One unit is used for the saturated electrolyte solution, and the other unit is used for dilution of the saturated solution. The latter may also serve for storing diluted solution.

In one embodiment, the system further comprises accessories for mixing, heat exchanging, solution pumping, concentration monitoring, temperature and pressure monitoring, liquid level monitoring or a combination thereof.

Other accessories and means for testing, monitoring, material transfer, pumping and controlling the system are part of the system in some embodiments.

In one embodiment, the saturated electrolyte unit comprises solid and saturated electrolyte solution. In another embodiment, the saturated electrolyte unit comprises solid KOH and a KOH saturated solution or solid NaOH and a NaOH saturated solution. Due to the fact that the saturated unit comprises both solid and a saturated electrolyte solution formed by the same material forming the solid, equilibrium is formed between the solid and the solution, causing the solution to be saturated at all times. The saturated solution is at a concentration much higher than the concentration needed for the consumer (e.g. a metal air battery). The contents of the saturated electrolyte unit comprising the saturated solution and its corresponding solid serves as a reservoir of raw material for the preparation of electrolyte at the concentration required by the consumer. The solid in the saturated tank is submerged in the solution, and therefore it is not exposed to air, and is less likely to deteriorate or to absorb contaminating materials. When the consumer (e.g. the metal air battery) requires fresh electrolyte, some of the saturated solution is pumped into the diluted electrolyte unit, and diluted to the required concentration. After consuming some of the saturated solution from the saturated electrolyte unit, the saturated solution may be replenished (when necessary) by adding more liquid (e.g. water) into the saturated electrolyte unit so that the saturated unit does not dry out. After replenishing, the solution will return to its saturation concentration due to solid dissolving. This process may be repeated until all the solid dissolves. Following complete solid dissolution, operation of the system continues in one of two options: (i) more solid is added; or (ii) the saturated solution left in the saturated unit is continued to be transferred to the diluted unit until it is completely consumed or until it reaches a certain volume level According to option (i) and in one embodiment, the additional solid is added to the saturated solution tank in order to compensate for the consumed solid. Such addition of solid can be done any time.

In one embodiment, the system of this invention comprises a liquid source. In another embodiment the liquid source includes water. In another embodiment the liquid source includes deionized (DI) water. In another embodiment, the liquid further comprising stabilizing agents. In another embodiment, the stabilizing agent comprises stannates, nano-sized ceramic materials or combination thereof.

In another embodiment, the liquid source is connected independently to the saturated electrolyte unit and to the diluted electrolyte unit. In another embodiment the liquid source could exist out of the vehicle's board and could be used according the necessity. In one embodiment, the liquid source is placed in a road-side station. In another embodiment, the first inlet of said saturated electrolyte unit, the second inlet of the diluted electrolyte unit or combination thereof are connected to the liquid source such that liquid can be transferred independently from said liquid source to said saturated electrolyte unit, and/or to said diluted electrolyte unit.

In one embodiment, the saturated electrolyte supplied by the saturated electrolyte unit is diluted with a liquid supplied by the liquid source, in the diluted electrolyte unit, thus producing an electrolyte composition suitable for the metal air battery operation.

In one embodiment, once a saturated electrolyte supplied to the diluted electrolyte unit, liquid (supplied by the liquid source) is added to the saturated electrolyte unit, to dissolve further solid alkaline salt therein to produce saturated electrolyte solution.

Advantages of systems of the invention include but are not limited to production of electrolyte at a required site (e.g. on board the electric vehicle operated by the consumer), production of electrolyte on demand, using liquid for electrolyte dilution from external source, increased safety in dilution, simple and safe loading of raw materials, better storage and handling of raw materials, simple heat management, and utilization of heat generated in dilution.

In one embodiment, all the actions or operation steps in the system are performed automatically. The system provides control over the various pumps and it is capable of measuring temperature and concentration of the solutions in the saturated liquid tank, and in the diluted electrolyte tank. Such sensing, monitoring and control allows for thermal control by determining the pace of the dilution process. Moreover, the control and measurement elements and methods allow for production of electrolyte at the required concentration. In one embodiment, level and weight sensors in the tanks allow for accurate production of electrolyte at the required amount and concentration. Elements, systems and methods of the invention enable overall management of the electrolyte producing system, and determination of the available quantities of the different materials involved.

The electrolyte preparation system of this invention is safe with regards to handling the heat that may be released during the preparation process. In addition, in some embodiments wherein the electrolyte is used in elevated temperatures, some of the energy that is released during electrolyte preparation is used to preheat the electrolyte.

System Components

The FIGURE is a schematic block diagram of one embodiment of the invention. The system depicted in the FIGURE comprises a saturated electrolyte unit (1-10): a diluted electrolyte unit (1-20) and optional a liquid source (1-30). The liquid source could exist either on the board (of the e.g. electric vehicle operated by the metal-air battery) or outside the vehicle/appliance operated by the battery. The saturated electrolyte unit receives diluting liquid through inlet (1-90) as required. The diluted electrolyte unit receives diluting liquid through inlet (1-100) as required. The diluted electrolyte unit receives saturated solution from the saturated electrolyte unit by the connection (1-180) as required. The liquid source receives diluting liquid through inlet (1-110) as required.

Inlet (1-120) is used for refilling solid into the saturated electrolyte unit. The solid may be contained in a separate solid container (not shown) and may be drawn from there into the saturated electrolyte unit upon demand.

The system optionally comprises accessories for mixing the contents of the saturated electrolyte unit (1-40), the diluted electrolyte unit (1-50), the consumer (not shown) or a combination thereof. The system optionally comprises heat exchangers for the saturated electrolyte unit (1-60*a*), the diluted electrolyte unit (1-60*b*), the consumer (element not shown) or combination thereof. The system optionally comprises a concentration monitor for the saturated electrolyte unit (1-80*a*), the diluted electrolyte unit (1-80*b*), the consumer (1-80*c*) or combination thereof. The system is connected to a consumer (1-130) through inlet (1-200).

In one embodiment, the consumer comprises an outlet (1-190) to remove used electrolyte, while transferring fresh electrolyte composition from the diluted electrolyte unit.

The system further comprises a diluted electrolyte unit outlet (1-140) for removing excess dilution liquid from the diluted unit.

Optionally, the saturated electrolyte unit (1-10), the diluted electrolyte unit (1-20), the consumer (1-130) or combination thereof further comprises a liquid level tester (1-150 *a,b,c*). Optionally, the saturated electrolyte unit (1-10), the diluted electrolyte unit (1-20), the consumer (1-130) or combination thereof comprise a temperature gauge (1-160 *a,b,c* respectively) and/or a pressure gauge (1-170 *a,b,c* respectively).

System Initialization

In one embodiment, a mixture of saturated electrolyte and solid electrolyte is prepared outside of the system, and is inserted into the saturated solution tank (1-10). In one embodiment, a saturated electrolyte solution is prepared outside of the system, and is inserted into the saturated solution tank (1-10).

Additional solid is inserted into the saturated electrolyte unit. The solid does not dissolve in the saturated solution, and therefore it precipitates in the unit. Accordingly, this process does not generate heat.

In another embodiment, the saturated solution is made within the saturated unit by adding solid and liquid such that a saturated solution is formed and excess solid precipitates at the bottom of the tank.

After system initialization, the system can function in either batch mode or continues mode as will be described herein below:

Batch Mode Operation

In one embodiment, an electrolyte producing system of the invention is operated as follows:

a. A demand for an electrolyte for the consumer (1-130) is made. The demand for electrolyte is a result of a change in the electrolyte composition or electrolyte amount in the consumer. A critical parameter of the electrolyte in the consumer is measured by an appropriate gauge (e.g a transducer). The critical parameter that is used for determining demand for electrolyte is selected from but is not limited to the group consisting of electrolyte pH, electrolyte density, temperature, pressure, volume, weight and/or total amount; concentration of metal fuel (e.g. Al, Zn, etc.) in the electrolyte. $Na^+$ or $K^+$ content, electrolyte conductivity or combination thereof.

b. An electrolyte is transferred from the diluted electrolyte unit (1-20) to the consumer (1-130). The transferred amount can be up to the full quantity of electrolyte in the diluted electrolyte unit.

c. The diluted electrolyte unit is refilled by transferring saturated electrolyte from the saturated electrolyte unit (1-10) to the diluted electrolyte unit (1-20). In one embodiment, transfer is conducted using a pump. A dilution liquid is added from the liquid source (1-30) or from an external source to the diluted electrolyte unit through inlet (1-100). The amount of each transfer/addition depends on the electrolyte critical parameters measured by a gauge located within the dilution tank. The gauge(s) are similar to the gauges utilized within the consumer as described herein above. In one embodiment, the dilution liquid is added first, followed by addition of saturated electrolyte.

d. Replenishing the saturated electrolyte by adding diluting liquid through inlet (1-90) to saturated electrolyte unit (1-10).

In one embodiment, the order of steps b and c described hereinabove is determined by the requirements of the consumer system. Step c can be before step b, in case the diluted electrolyte unit is empty.

In one embodiment, and depending on the thermodynamic properties of the electrolyte, the ambient temperature, and the electrolyte temperature required, a heat exchanger (1-60*b*) is used to cool down the electrolyte within the diluted electrolyte unit (1-20).

In one embodiment, mixing the solution in the diluted electrolyte unit using mixer (1-50) is conducted. This operation is optional, depending on the solution properties. In one embodiment, the solution concentration in the diluted electrolyte unit is monitored using monitor (1-80) and can be accurately adjusted to the concentration required by the consumer for any certain batch/delivery.

In one embodiment, additional materials (e.g. stannates and nano sized ceramic particles) are introduced into the electrolyte during this operation cycle. In another embodiment, the additional materials are added together with the dilution liquid in the liquid source (1-30).

In one embodiment, the electrolyte composition further comprises materials for enhancement of metal air battery performance.

In one embodiment, and depending on the thermodynamic properties of the saturated electrolyte, and on the ambient temperature, a heat exchanger (1-60*a*) is used to cool down the saturated electrolyte.

In one embodiment, the contents of the saturated electrolyte tank are mixed using mixing element (1-40).

In one embodiment, the operation cycle comprising steps a to d continues until all the solid dissolves in the saturated electrolyte unit.

Following complete dissolution of the solid in saturated tank (1-10) the process may continue in two ways:

I. In one embodiment, concentrated solution from the saturated electrolyte unit is continued to be drawn into the diluted electrolyte unit for electrolyte preparation until the saturated solution is completely consumed or until it reaches a certain level. At this stage the system has to be initialized again (as described in the system initialization section herein above).

II. In one embodiment, more solid is added to the saturated electrolyte unit, and the operation cycle (steps a to d) continues.

ii. Continuous Mode Operation Description

In one embodiment, the maximal production rate of the system is defined as the maximal rate in which the system can dissipate the heat that is generated during its operation. This parameter is determined by the ambient temperature and the electrolyte temperature required by the consumer.

In one embodiment, a demand for electrolyte can be made in two ways, batch or continuous, at a rate that is equal or less than the maximal production rate.

In a continuous mode, steps b and c described hereinabove are performed in parallel. From the diluted electrolyte unit (1-20) the prepared electrolyte is transferred to the consumer (1-130). The transfer is conducted in one batch or continuously, at the rate required by the consumer. In case of one batch transfer, the transferred amount can be up to the full quantity of electrolyte in the diluted electrolyte unit.

In one embodiment, in a continuous mode, a continuous refilling of the diluted electrolyte unit is performed. The saturated electrolyte is continuously transferred from the saturated electrolyte unit (1-10) to the diluted electrolyte unit (1-20). The transfer is made by a pump, or by other means.

The diluting liquid is continuously being added from the liquid source (1-30) to the diluted electrolyte unit through connection (1-100).

The rate of transferring saturated electrolyte and of adding diluting liquid is determined by electrolyte concentration that is required by the consumer system. Depending on the thermodynamic properties of the electrolyte, on the ambient temperature, and the electrolyte temperature required by the consumer, the heat exchanger (1-60$b$) may be used to cool down the electrolyte. Mixing is optional, depending on the solution properties and is carried out by mixer (1-50).

The solution concentration is continuously monitored, so that it can be fixed to the concentration required by the consumer (1-80$b$).

The saturated electrolyte is continuously replenished by adding the diluting liquid through connection (1-90). Depending on the thermodynamic properties of the saturated electrolyte, and on the ambient temperature, heat exchanger (1-60$a$) may be used to cool down the saturated electrolyte. Mixing operation in the saturated electrolyte tank is optional, depending on the solution properties (mixer element 1-40).

The continuous mode cycle described above (steps a to d) may continue until all the solid in the saturated solution tank dissolves.

In one embodiment, once all the solid dissolves in the electrolyte saturated unit:

1. Subsequent preparation of electrolyte by continuously transferring concentrated solution from the saturated electrolyte unit, possibly until it is completely consumed. The system is then initialized again.

2. More solid is added to the saturated electrolyte unit, and the cycle (steps a to d) continues.

Concentration Monitoring

In one embodiment, the concentration of the electrolyte solution in the diluted electrolyte unit is monitored by one of the following methods: (i) monitoring the conductivity of the electrolyte in the diluted electrolyte unit; (ii) monitoring the refraction index of the electrolyte in the diluted electrolyte unit; (iii) monitoring the pH of the electrolyte in the diluted electrolyte unit.

Definitions

In one embodiment, metal-air cells or batteries have high energy density. In metal air batteries the oxidizing reactant (oxygen) which undergoes reduction during discharge is supplied from outside the cell. This reaction of oxygen reduction occurs in the presence of water and gives hydroxide ions (OH—). The oxygen is reduced on the surface of a cathode during discharge.

In one embodiment, a consumer refers to the consumer of the prepared electrolyte. In one embodiment, the consumer is a battery. In one embodiment, the consumer is a battery comprising an electrolyte.

In one embodiment, metal air battery refers to Al-air battery or Zn-air secondary battery.

In one embodiment, a diluted or a saturated electrolyte unit comprises a tank, a reservoir, a container, a hose, a tube a conduit, or any element that encloses a volume wherein a liquid or solution may be contained. In one embodiment, the diluted electrolyte unit is termed the diluted unit. In one embodiment, the saturated electrolyte unit is termed the saturated unit.

In one embodiment, a liquid refers to any material in a liquid form including pure materials and solutions comprising solvent(s) and solute(s). In another embodiment, a diluting liquid refers to water. In another embodiment to DI water.

In one embodiment, a liquid source comprises a tank, a reservoir, a container, a hose, a tube a conduit, or any element that encloses a volume wherein a liquid or solution may be contained or transferred through.

In one embodiment, this invention provides an electric vehicle comprising the electrolyte production system of this invention, wherein the vehicle drives on metal air energy and wherein solid is added to the saturated electrolyte unit for generating electrolyte, to allow additional driving range. In one embodiment, metal air energy refers to the energy provided by a metal air battery. In one embodiment generating electrolyte refers to producing electrolyte. In one embodiment, driving range is the distance that can be traveled by the vehicle. In one embodiment, driving range is expressed in kilometers or miles.

In one embodiment, an electrolyte is the phase through which charge is carried by the movement of ions. Electrolytes may comprise liquid solutions or fused salts or ionically-conductive solids. Electrolytes may comprise solutions of ionic compounds dissolved in water. The second phase at the boundary of the electrolyte may be another electrolyte or it might be an electrode. In a battery or cell, the electrolyte is in contact with an electrode in one embodiment.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

Materials, Ranges and Dimensions

In one embodiment, the system and method of this invention comprise a saturated electrolyte unit. In another embodiment, the saturated unit comprises a saturated electrolyte solution and a precipitate. In one embodiment, the saturated electrolyte solution comprises an aqueous alkaline saturated solution. In another embodiment, the saturated solution comprises an alkaline hydroxide. In another embodiment the saturated solution comprises NaOH or KOH. In another embodiment, the concentration of the saturated alkaline solution is between 20% to 60% wt/wt. In another embodiment, the concentration of saturated KOH solution is between 50% to 60% wt/wt. In another embodiment, the concentration of the saturated KOH solution depends on temperature.

In one embodiment, the saturated electrolyte unit comprises solid and saturated electrolyte solution. In another embodiment, the saturated electrolyte unit contains solid KOH and a KOH saturated solution or solid NaOH and a NaOH saturated solution. In another embodiment, after the initialization phase or after adding more solid to the saturated electrolyte unit, the weight ratio between solid KOH and saturated solution of KOH or between solid NaOH and saturated solution of NaOH is between (1:20) to (100:1).

In one embodiment, the volume of the saturated solution depends on the volume/size of the saturated electrolyte unit. In another embodiment, the saturated electrolyte unit comprises between 20 to 100 liters of saturated solution.

In one embodiment, solid is added to the saturated electrolyte solution. In another embodiment, the solid is an alkaline solid corresponding to the electrolyte saturated solution. In another embodiment, the alkaline solid is NaOH(s) or KOH(s).

In one embodiment, the system and methods of this invention comprise a diluted electrolyte unit. In another embodiment, the diluted electrolyte unit comprises an electrolyte in a concentration suitable for a metal air battery.

In another embodiment, solid is added to the saturated electrolyte solution. In another embodiment, the solid is an alkaline solid corresponding to the electrolyte saturated solution. In another embodiment, the alkaline solid is NaOH(s), or KOH(s). In one embodiment, solid alkaline is added to the saturated solution in weight ratios between (1:20) to (100:1) of (solid:saturated solution). In another embodiment 1 to 2 kg solid alkaline is added to every 0.5 to 1 liter of saturated solution.

Additional System Components:

In one embodiment, the system and method of this invention are directed to electrolyte production for metal air battery. In another embodiment, this invention is directed to aluminum air battery. The aluminum of the aluminum air battery is mechanically loaded into the metal air cells. During the operation of the battery, the products of the electrochemical reaction in it (mainly potassium aluminate) dissolve into the electrolyte, which is circulated through the battery. When the electrolyte cannot absorb additional reaction products, the battery performance is degraded, until the electrolyte is replaced. In one embodiment, one liter of electrolyte allows the utilization of 500 Wh before it has to be replaced. Additionally, it is considered that the electric vehicle consumes 125 Wh per one kilometer of driving. Accordingly, for long-term use of the metal air battery, fresh electrolyte has to be supplied to the system whenever the on-board electrolyte is completely utilized.

In one embodiment, the practical size of an aluminum air battery with a capacity of 500 kWh is considered. This system carries enough energy for 4,000 km of driving. This system requires 1000 liters of electrolyte in order to utilize all the energy of the aluminum. It is only after using 500 kWh of energy from the aluminum, that new aluminum anode has to be loaded into the battery. In order to allow practical use of the system, 10 batches of 100 liters of electrolyte need to be used, each allowing a driving range of 400 km. This requires the ability to load the battery with fresh electrolyte after every 400 km of driving. The infrastructure required for this is similar to that of gasoline stations, where electrolyte has to be transported into distant loading points.

In one embodiment, the practical size of an aluminum air battery with a capacity of 500 kWh is considered. This system carries enough energy for 4,000 km of driving. This system requires 1000 liters of electrolyte in order to utilize all the energy of the aluminum. It is only after using 500 kWh of energy from the aluminum, that new aluminum anode has to be loaded into the battery. In order to allow practical use of the system, 10 batches of 100 liters of electrolyte need to be used, each allowing a driving range of 400 km. This requires the ability to generate fresh electrolyte after every 400 km of driving. Each 400 km, the system is refilled with water for generating electrolyte for the next 400 km. Each 800 km, the system is refilled with saturated electrolyte or solid for generating electrolyte for the next 800 km.

In one embodiment, the battery carries enough energy for 4,000 km of driving. This battery requires 1000 liters of electrolyte in order to utilize all the energy of the aluminum. In order to allow practical use of the system, 10 batches of 100 liters of electrolyte need to be used, each allowing a driving range of 400 km. This requires the ability to generate 100 liters of fresh electrolyte after every 400 km of driving. In one embodiment, systems and methods of this invention enable the generation of ten batches of 100 liters of electrolyte. In one embodiment, systems of the invention provide saturated electrolyte tank and a diluted electrolyte tank. When 100 liters of fresh electrolyte is needed for the battery (or any time before this need), saturated electrolyte is transferred to the dilution tank and diluted by water to the concentration required by the battery. The diluted electrolyte is then transferred to the battery. For such electrolyte preparation, water needs to be added to the dilution tank from a liquid source placed on the vehicle or external to the vehicle (e.g. at home or at a road-side station). When the 100 liters of electrolyte in the battery need to be replaced again, the used 100 liters is drained from the battery and the process of transferring saturated electrolyte to the dilution tank and adding water to it is repeated. This process can be repeated numerous times until the saturated solution is depleted to some level or consumed. When the saturated solution is depleted or consumed, more water is added to the saturated solution tank to dissolve more solid and to produce more saturated solution. When the entire solid in the saturated solution tank is dissolved, more solid is added into the saturated solution tank.

In one embodiment, preparation of diluted electrolyte solution, preparation of additional saturated solution, and refill and draining the battery electrolyte compartment and the diluted and saturated tanks can be conducted automatically in the case where the liquid source is placed on board the vehicle. Various gauges and monitors control such automated process.

In one embodiment, where the liquid source is placed outside the vehicle, filling the diluted tank, the saturated tank or a combination thereof with water can be carried out manually.

Such process can be used for batteries of any volume and for any electrolyte concentration.

In one embodiment, this invention provides an electric vehicle comprising an electrolyte production system of the invention, wherein the vehicle drives on metal air energy and wherein water is transferred to the saturated electrolyte unit, to the diluted electrolyte unit or to a combination thereof for electrolyte generation to allow additional driving range.

In one embodiment, this invention provides an electric vehicle comprising an electrolyte production system of the invention, wherein the vehicle drives on metal air energy and wherein saturated electrolyte is added to said saturated electrolyte unit for electrolyte generation to allow additional driving range.

In one embodiment, this invention provides an electric vehicle comprising an electrolyte production system of the invention, wherein the vehicle drives on metal air energy and wherein solid is added to the saturated electrolyte unit for generating electrolyte, to allow additional driving range.

In one embodiment, the Aluminum electrode is being replaced once it is totally consumed. In another embodiment, the Al electrode is consumed within about. 4,000 km.

Uses

In one embodiment, electrolyte production systems of the invention are utilized for metal air batteries in electric vehicles. In one embodiment, electric vehicles comprising electrolyte production systems of this invention comprise but are not limited to cars, trucks, motorcycles, bikes, golf carts/cars, three and four wheels mobility scooters (such as scooters for a disabled person), and toy vehicles.

EXAMPLES

Example 1

System for Preparing Potassium Hydroxide Electrolyte

A system for the preparation of potassium hydroxide (KOH) electrolyte in a concentration suitable for a metal air battery was constructed. The system was used for the preparation of the KOH electrolyte in a concentration as required by the consumer.

i. System Initialization (Preparation of a Mixture of Saturated Solution and Solid).

System initialization was performed as follows:

A. a solution (solution A) of 30% (wt/wt) of potassium hydroxide in water was prepared.

B. 4000 g of solution A were placed in a container and 1800 g of solid potassium hydroxide were added. The concentration of the resultant solution was about 51%±1% (wt/wt) KOH in water (solution B).

C. 4623 g of solution B were placed in a container and 4000 g of solid potassium hydroxide were added (the 4000 g KOH solid contained 3600 g KOH and 400 g $H_2O$). The resultant mixture (mixture C) comprising a saturated KOH solution and solid KOH was used in the saturated solution tank.

ii. Initial Contents of the Saturated Solution Tank

The saturated solution tank was filled with 8623 g of material comprising mixture C, i.e. the saturated potassium hydroxide solution and solid potassium hydroxide prepared in step C. The volume levels in the saturated solution tank were as follows:

0 to 3600 cc of solid KOH 3600 cc to 4500 cc of saturated solution.

The 8623 g of saturated potassium hydroxide solution were composed of about 6003 g potassium hydroxide and about 2619 g water.

This 8623 g of saturated potassium hydroxide solution is sufficient to produce 20,012 g of 30% potassium hydroxide electrolyte.

iii. System Components

The saturated solution tank (1-10) was a 5 liter plastic beaker. The dilution tank (1-20) was a 2 liter plastic beaker. The transfer system from the saturated solution tank to the dilution tank was a syringe. The mixing of the saturated solution tank (1-40) was done by a circulating pump. The mixing in the diluted solution tank (1-50) was done by a magnetic stirrer. No heat exchangers were used in this experiment. Monitoring the concentration (1-80$a,b$) was performed by a titration apparatus. The replenishing liquid for the saturated solution tank was DI water. The dilution liquid for the dilution tank was DI water. No special system was used for transferring the prepared electrolyte from the dilution tank to the consumer. The system was operated in a batch mode.

The following table summarizes the batches:

TABLE 1

| Batch No. | Amount of solution removed From Saturated solution tank [cc] | Concentration of Solution removed [% wt/wt] | Amount of 30% KOH solution that was prepared(=diluted solution, electrolyte)[Kg] | Volume of 30% KOH solution that was prepared(=diluted solution, electrolyte) [Lit] |
|---|---|---|---|---|
| 1 | 545 | 54.0 | 1.521 | 1.18 |
| 2 | 545 | 58.0 | 1.686 | 1.31 |
| 3 | 545 | 56.0 | 1.607 | 1.25 |
| 4 | 545 | 56.0 | 1.607 | 1.25 |
| 5* | 545 | 56.0 | 1.607 | 1.25 |
| 6 | 2000 | 52.0 | 5.312 | 4.13 |
| Sum | 4725 | | 13.34 | 10.4 |

*Note 1
After consuming batch number 5 no solid remained in the saturated solution tank. The amount of solution that remained in the tank was about 4550 cc. Of the 4550 cc, about 2000 cc was used to make electrolyte in batch number 6, and the rest remained in the tank.

After removing of batch number 6, the system was "refueled" by adding more solid potassium hydroxide into the saturated solution tank. 4000 g of solid KOH was added. This solid was composed of ~3600 g of potassium hydroxide, and ~400 g of water.

The levels in the tank were 0 to ~3500 cc of solid, and ~3500 cc to ~4500 cc of solution.

The following table summarizes the activity after refueling the system:

TABLE 2

| Refuel No. | Amount of removed concentrated solution [cc] | Concentration of Solution removed (diluted solution, electrolyte) [% wt/wt] | Amount of 30% KOH solution that was prepared (diluted solution, electrolyte) [Kg] | Volume of 30% KOH solution that was prepared [Lit] |
|---|---|---|---|---|
| 7 | 545 | 56.0 | 1.607 | 1.25 |
| 8 | 545 | 48.0 | 1.295 | 1.01 |
| 9 | 545 | 55.0 | 1.566 | 1.22 |
| 10 | 545 | 46.0 | 1.222 | 0.95 |
| 11 | 545 | 39.0 | 0.980 | 0.76 |
| 12 | 545 | 47.0 | 1.259 | 0.98 |
| 13 | 545 | 50.5 | 1.390 | 1.08 |
| 14 | 4000 | 48.0 | 9.508 | 7.39 |
| Sum | 7815 | | 18.83 | 14.6 |

Example 2

Electrolyte for Aluminum-Air Battery that Propels an Electric Vehicle

A system that produces potassium hydroxide (KOH) electrolyte comprising 30% (wt/wt) potassium hydroxide dissolved in water was constructed and operated. The electrolyte consumer was an aluminum-air battery that was used for propelling an electric vehicle.

The initial state of the saturated solution of the electrolyte production system is considered as including 90.3 kg of KOH. The initial state of the saturated solution of the electrolyte production system is considered as including 90.3 kg of KOH, and 44.1 liters of water, and the dilution liquid tank included 50 liters of water. The solution in the saturated solution tank has a concentration of 52%, and 47.7 Kg of KOH is dissolved in it. The rest of the KOH (42.6 kg) is in a solid form, at the bottom of the tank as precipitate. The electrolyte is used as described in table 3:

TABLE 3

| Step | Volume of solution in the saturated solution tank, L | Amount of dissolved KOH in the saturated solution tank (kg) | Amount of solid KOH in the saturated solution tank (kg) | Amount of water in the dilution liquid tank (L) | Amount of saturated solution used (L) | Amount of diluting liquid used, (L) | Amount of electrolyte produced | Amount of KOH consumed by the aluminum-air battery (L) | Comment |
|---|---|---|---|---|---|---|---|---|---|
| Init | 60 | 47.7 | 42.6 | 50 | | | | | |
| 1 | 6.4 Left in tank | 5.1 | 42.6 | 3.6 Left in tank | 53.6 | 46.4 | 100 | | Electrolyte production |
| 2 | | | | | | | | 100 | Consumption while driving 400 km |
| 3 | 60 | 47.7 | 0.0 All solid dissolved | 50 | | | | | Reload water |
| 4 | 6.4 Left in tank | 5.1 | 0.0 | 3.6 Left in tank | 53.6 | 46.4 | 100 | | Electrolyte production |
| 5 | | | | | | | | 100 | Consumption while driving 400 km |
| 6 | 60 | 47.7 | 42.6 | 50 | | | | | Reload water and solid KOH |

Steps 1 to 6 in table 3 are performed repeatedly, until all the energy in the aluminum-air battery is consumed. The system is reloaded with raw materials in steps 3 and 6. In step 3, only water is added. In step 6, water and solid KOH are added. In one embodiment, the system does not require reloading of KOH solution as only solid KOH and water are added.

In this electric vehicle example, the system allows the vehicle to drive on electric power with loading of water after every 400 km driven, solid KOH every 800 km, and solid aluminum every 4,000 km.

Benefits of this system include but are not limited to:
No need for transportation or storage of KOH solution.
No need for loading KOH solution As a result, the logistics and infrastructure required to support aluminum-air propelled vehicles is simple, and similar to ordinary car cycles: refueling every 500 km and service every 10,000 km. After driving for 4,000 km, all the aluminum in the system is consumed, and new aluminum is installed in the system.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of providing heated electrolyte to a metal air battery, the method comprising:
preparing a saturated-electrolyte solution by mixing a solid ionic compound in a liquid in a single-compartment saturated-electrolyte reservoir,
transferring a portion of the prepared saturated-electrolyte solution from the saturated-electrolyte reservoir directly to a diluted-electrolyte reservoir,
in a dilution process, controllably mixing water with the portion of saturated electrolyte solution in the diluted-electrolyte reservoir to form a freshly diluted electrolyte solution that has a concentration and a functional temperature suited to operate the metal air battery,
wherein a pace of the dilution process is determined to heat the freshly diluted electrolyte solution to the functional temperature, and
transferring the freshly diluted electrolyte solution to the metal air battery.

2. The method of claim 1, wherein the mixing is carried out by adding the water to the transferred portion of the saturated-electrolyte solution.

3. The method of claim 2, further comprising controlling the pace of the dilution process with respect to thermodynamic properties of the diluted electrolyte solution, ambient temperature, and the functional diluted-electrolyte temperature required by a consumer.

4. The method of claim 1, wherein the mixing is carried out by adding the transferred portion of the saturated-electrolyte solution to the water.

5. The method of claim 4, further comprising controlling the pace of the dilution process with respect to thermodynamic properties of the diluted electrolyte solution, ambient temperature, and the functional diluted-electrolyte temperature required by a consumer.

6. The method of claim 1, wherein the preparing of the saturated-electrolyte solution is carried out to maintain the solid ionic compound in contact with the saturated-electrolyte solution.

7. The method of claim 1, wherein the controllable mixing is carried out during the transferring of the portion of the saturated-electrolyte solution.

8. The method of claim 1, wherein the water further comprises at least one stabilizing agent comprising stannates and/or nano-sized ceramic materials.

9. The method of claim 1, wherein the metal air battery is an aluminum air battery.

10. The method of claim 1, wherein the solid ionic compound is solid KOH, the saturated-electrolyte solution is a saturated solution of KOH and the freshly diluted electrolyte solution is a KOH solution at the concentration suited to operate the metal air battery.

11. The method of claim 10, wherein a ratio of the solid KOH to the saturated KOH solution in the saturated-electrolyte reservoir is between 1:20 and 100:1.

12. The method of claim 1, wherein the solid ionic compound is solid NaOH, the saturated-electrolyte solution is a saturated solution of NaOH and the freshly diluted electrolyte solution is a NaOH solution at the concentration suited to operate the metal air battery.

13. The method of claim 12, wherein a ratio of the solid NaOH to the saturated NaOH solution in the saturated-electrolyte reservoir is between 1:20 and 100:1.

14. The method of claim 1, further comprising adding solid ionic compound to the saturated-electrolyte reservoir upon consumption of the solid ionic compound in the saturated-electrolyte reservoir.

15. The method of claim 1, wherein the controllable mixing of the water with the saturated electrolyte solution is carried out on a vehicle that is at least partly operated by the metal-air battery.

16. The method of claim 1, further comprising measuring at least a temperature and/or a concentration of at least one of the solutions and determining the pace of the dilution process to provide thermal control of the dilution process.

17. The method of claim 1, further comprising using a heat exchanger to cool the freshly diluted electrolyte.

18. The method of claim 1, further comprising utilizing heat generated during the dilution process to preheat the freshly diluted electrolyte.

* * * * *